United States Patent

Clarke et al.

Patent Number: 5,676,224
Date of Patent: Oct. 14, 1997

[54] ELECTRICAL COLLECTOR SHOE ASSEMBLY

[75] Inventors: Robin A. Clarke, Woodbridge; William R. Heil, Shelton; Robert S. Beale, Stratford, all of Conn.

[73] Assignee: Howell Corp, Stratford, Conn.

[21] Appl. No.: 617,962

[22] Filed: Mar. 18, 1996

[51] Int. Cl.⁶ .................................................. B60L 5/08
[52] U.S. Cl. ........................................... 191/49; 191/59.1
[58] Field of Search .................................. 191/45 R, 47, 191/49, 52, 54, 57, 58, 59, 59.1, 60.5

[56] References Cited

U.S. PATENT DOCUMENTS

| | | | |
|---|---|---|---|
| 2,794,078 | 5/1957 | Hinrichs | 191/59.1 |
| 3,114,441 | 12/1963 | Sprigings | 191/59.1 X |
| 3,303,294 | 2/1967 | Howell, Jr. | 191/64 |
| 3,506,099 | 4/1970 | Howell, Jr. | 191/23 |
| 3,525,823 | 8/1970 | Howell, Jr. | 191/59.1 |
| 3,649,779 | 3/1972 | Howell, Jr. | 191/45 A |
| 3,902,579 | 9/1975 | Howell, Jr. | 191/29 |
| 3,995,725 | 12/1976 | Howell, Jr. | 191/23 A |
| 3,998,306 | 12/1976 | Howell, Jr. | 191/23 |
| 4,016,961 | 4/1977 | Howell, Jr. | 191/23 A |
| 4,106,599 | 8/1978 | Howell, Jr. | 191/27 |
| 4,155,434 | 5/1979 | Howell, Jr. | 191/22 R |
| 4,163,485 | 8/1979 | Howell, Jr. | 191/40 |
| 4,416,357 | 11/1983 | Szysh | 191/59.1 X |
| 5,373,926 | 12/1994 | Clarke et al. | 191/23 R |

FOREIGN PATENT DOCUMENTS

| | | | |
|---|---|---|---|
| 599951 | 7/1934 | Germany | 191/59.1 |
| 206114 | 1/1984 | Germany | 191/59 |
| 559129 | 2/1944 | United Kingdom | 191/59.1 |
| 83/01419 | 4/1983 | WIPO | 191/59 |
| 92/05975 | 4/1992 | WIPO | 191/59.1 |

Primary Examiner—Karen B. Merritt
Assistant Examiner—Scott L. Lowe
Attorney, Agent, or Firm—H. Gibner Lehmann; K. Gibner Lehmann

[57] ABSTRACT

An electrical collector shoe assembly for a rail electrification system, including a metal holder member in the form of an elongate block body having spaced-apart gripping flanges projecting from its opposite sides upwardly and inwardly of the body, an elongate metal collector shoe extending along the top of the block body and having recessed surfaces in its opposite sides and in which the gripping flanges are disposed, and advanceable studs carried by the block body and engaged with the under portion of the collector shoe, applying an upward thrust to the shoe to cause the gripping flanges of the block body to be forcibly engaged with the recessed surfaces of the shoe. There is thus established a unitary electrical and mechanical connection between the shoe and holder member. Servicing and/or replacement of the shoe is greatly facilitated as a consequence of the simplicity of the assembly.

13 Claims, 2 Drawing Sheets

ELECTRICAL COLLECTOR SHOE ASSEMBLY

CROSS REFERENCES TO RELATED APPLICATIONS/PATENTS

1. U.S. Pat. No. 3,995,725, issued Dec. 7, 1976, entitled HANGER FOR CONDUCTOR RAILS, and having common ownership with the present application.

2. U.S. Pat. No. 5,373,926, issued Dec. 20, 1994, entitled INSULATED RAIL ELECTRIFICATION SYSTEM, and having common ownership with the present application. The entire disclosure of U.S. Pat. No. 3,995,725 and the entire disclosure of U.S. Pat. No. 5,373,926 are incorporated into the present application, by specific reference made herein.

3. Our co-pending U.S. application Ser. No. 08/582,148 filed Dec. 19, 1995, entitled COMPOSITE ELECTRICAL CONDUCTOR RAIL, and having common ownership with the present application.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to rail electrification systems, and more particularly to improvements in collector shoe constructions utilized in such systems.

2. Description of the Related Art Including Information Disclosed under 37 CFR §§1.97–1.99

The following references are hereby cited as being of interest in the technical field of the invention:

U.S. Pat. Nos.:

| | | |
|---|---|---|
| 3,303,294 | 3,506,099 | 3,525,823 |
| 3,649,779 | 3,902,579 | 3,995,725 |
| 3,998,306 | 4,016,961 | 4,106,599 |
| 4,155,434 | 4,163,485 | 5,373,926 |

U.S. Pat. Nos. 3,998,306 and 4,016,961 illustrate typical rail constructions of a type which are utilized in rail electrification systems for industrial cranes, conveyers, hoists, monorail systems, automated storage and retriever systems, and Port Authority Equipment, as well as in other applications. In particular, the disclosed patented structures involve electrically conductive rail members having track portions constituted of steel and/or aluminum. In some cases, a flat contact strip is provided, preferably characterized by good wear resistance and electrical conductivity.

U.S. Pat. No. 3,303,294 discloses a typical rail electrification system which has, in the past, been utilized in trolley systems. The illustrated collector shoe assembly (54) comprises a bar of current-conducting material such as sintered copper and graphite, combined in suitable proportions to provide the desired strength/slide characteristics. The patent mentions at col. 6, line 4, the occurrence of a normal amount of wear of the shoe after a period of operation, to the extent that replacement of the shoe per se, is typically required.

U.S. Pat. No. 3,525,823 illustrates an electrical collector shoe construction which consists of two flat, plastic plates constituting a holder assembly, and an interposed conductor shoe, with the latter being secured by bolts that extend through the plastic plates so as to clamp the shoe in a fixed position therein. In operation, the assembly consisting of the plastic holder and shoe is capable of limited pivoting and tilting movement, to accommodate the irregularities inherent in composite rail systems consisting of joined rail sections.

A number of other collector shoe arrangements are shown in U.S. Pat. Nos. 3,506,099 and 3,649,779. No '099 illustrates multi-rail, multiple shoe arrangements in several different configurations, mainly involving side entry of the shoes through the mouth areas respectively, of a group of horizontally-disposed rails; patent No. '779 discloses multiple embodiments incorporating different arrangements of contact shoes that are held in position by metal brackets and projecting- or stud-type fasteners. The embodiment of FIG. 21 involves a shoe construction having one fixed shoe element or component, and a second, movable and spring-biased shoe element, all adapted to slide within the confines of a channel-like rail.

U.S. Pat. No. 4,155,434 discloses a three-phase rail system wherein the shoes are carried by nylon insulator blocks, col. 4, line 20, the blocks in turn being secured to metal support bars (84). The latter are in turn mounted for universal-type movement on a frame (48) secured to the underside of a railway car (46).

Other, known contact shoe structures are illustrated in U.S. Pat. Nos. 3,902,579 (item #14); 3,995,725 (item #24); 3,998,306 (item #16); and 4,016,961 (item #16). U.S. Pat. Nos. 4,106,599; 4,163,485; and 5,373,926 illustrate a number of known rail constructions, but do not show contact shoes per se, as in the previously noted references.

In order to meet the requirements of sliding-contact shoe/conductor rail installations, considerable care must be exercised to insure that the various rail sections are properly aligned and joined, as well as insuring that the mounting arrangement for the shoes be rugged so as to withstand the harsh operating environments encountered. These typically include wide temperature fluctuations, dust/dirt or other debris which often are deposited on the contact surfaces of the rails, and corrosion (as by salt or acid rain) of the contacting metals involved, which tends to occur over time.

The wear that occurs to the rail is typically spread out over the length of the track, whereas that of the shoe is concentrated in a relatively small surface area represented by the shoe face. Thus, servicing and/or replacement of the shoe must be undertaken periodically. This is best accomplished where the shoe is readily accessible and capable of being removed with a minimum of time, effort, and equipment.

With some of the known arrangements, replacement of the shoe was awkward, requiring disassembly of multiple parts of relatively complex construction.

Accordingly there has arisen a need for a rugged and reliable shoe construction which features long life, and which can be easily serviced and/or replaced.

SUMMARY OF THE INVENTION

The above disadvantages and drawbacks of prior collector shoe constructions are largely obviated by the present invention, which has for one object the provision of a novel and improved collector shoe assembly which is simple in its structure, rugged and reliable in use, and which greatly facilitates servicing and replacement of the collector shoe per se.

Yet another object of the invention is to provide an improved collector shoe assembly as above set forth, which can be readily fabricated and assembled with minimal time, and without the use of special tools, fixtures or the like.

Still another object of the invention is to provide an improved collector shoe assembly as above characterized, which is readily adaptable to existing rail installations, and with virtually no modifications of the latter being required.

A still further object of the invention is to provide an improved collector shoe assembly of the kind indicated, which is economical to manufacture and install, and which can provide reliable, trouble-free service over extended periods of use, and under a wide range of harsh operating conditions.

The above objects are accomplished by an electrical collector shoe assembly for a rail electrification system, comprising a metal holder member including an elongate block body having spaced-apart gripping means projecting from its opposite sides, upwardly and inwardly and above the top of the body, an elongate metal collector shoe extending along the top of the block body, the shoe having recessed surfaces in its opposite sides and in which the gripping means are disposed, and advanceable means carried by the block body and engaged with the under portion of the collector shoe, applying an upward thrust to the shoe so as to cause the gripping means of the block body to be forcibly engaged with the recessed surfaces of the shoe, thereby establishing firm electrical contact between the shoe and holder member.

The objects are further accomplished by an electrical collector shoe for a rail electrification system, comprising in combination an elongate metal body having elongate top and bottom substantially parallel surfaces, and having substantially parallel elongate side surfaces which are coextensive with the top and bottom surfaces, the body having recesses in its side surfaces which are juxtaposed to the bottom surface thereof, and wherein the recesses have surface areas which face in an upward sloping direction with respect to the side surfaces of the body.

The invention further provides a holder member for an electrical collector shoe, comprising an elongate block body having spaced-apart gripping means projecting from its opposite sides upwardly and inwardly and above the top of the body, the gripping means being disposed along the length of the body, and wherein portions of the gripping means overlie the top surface of the block body.

The arrangement is such that an especially simple holder/shoe assembly results, which is both inexpensive to manufacture and assemble, and which greatly facilitates servicing and/or replacement of the shoe on a routine maintenance basis, and without the need for special tools or the like.

Other features and advantages will hereinafter appear.

BRIEF DESCRIPTION OF THE DRAWINGS

In the drawings, illustrating a preferred embodiment of the invention.

DESCRIPTION OF THE PREFERRED EMBODIMENT

Figure 1:
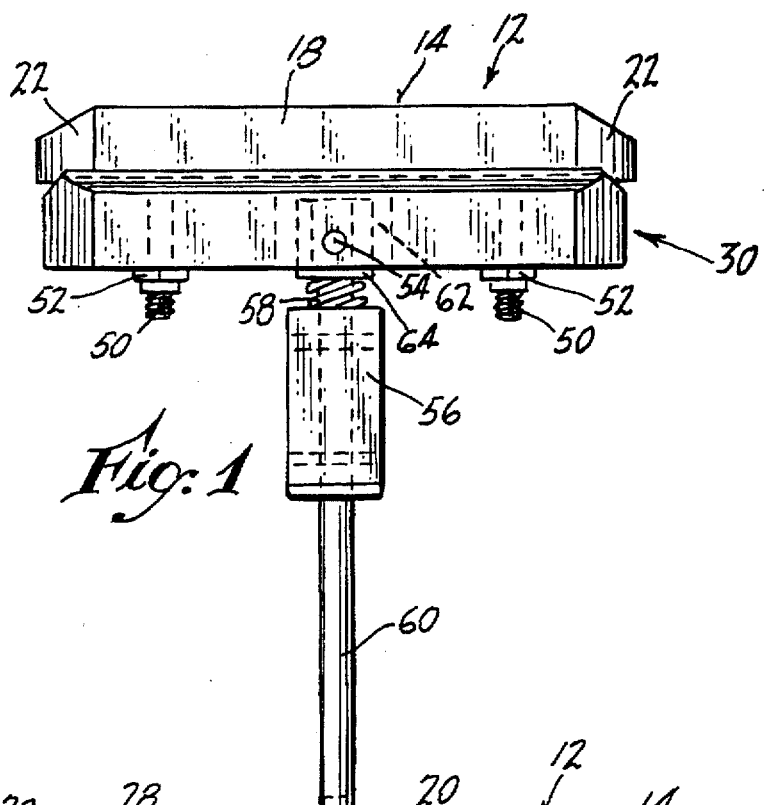
FIG. 1 is a front elevation of a collector shoe assembly for a rail electrification system, the assembly being constructed in accordance with the principles of the present invention.
Figure 2:
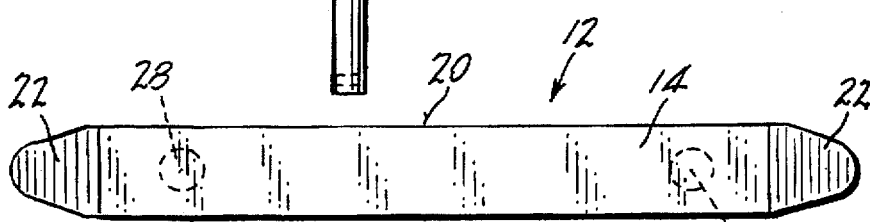
FIG. 2 is a top plan view of the collector shoe per se, of the assembly of FIG. 1.
Figure 3:
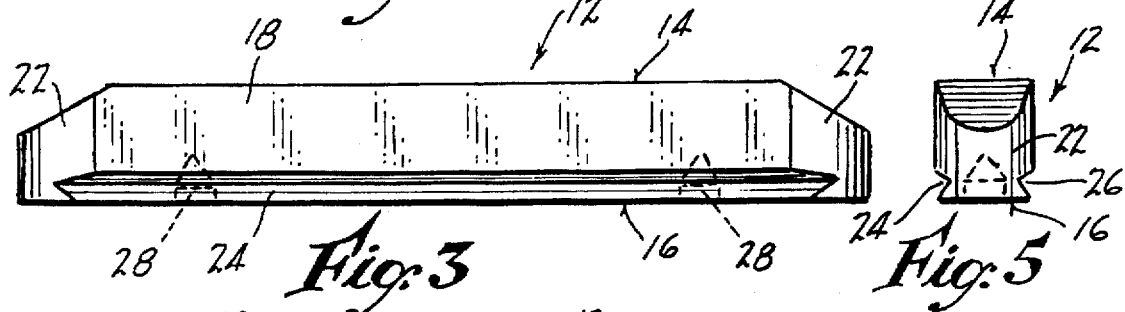
FIG. 3 is a front elevation of the collector shoe of FIG. 2.
Figure 5:
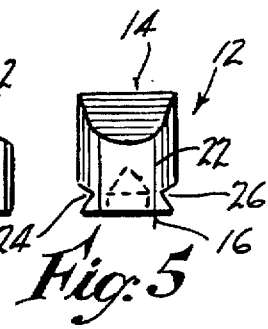
FIG. 5 is a right end elevation of the collector shoe of FIGS. 2–4.
Figure 4:
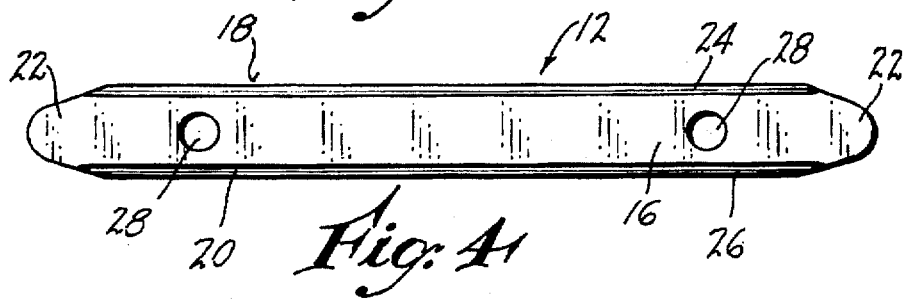
FIG. 4 is a bottom plan view of the collector shoe of FIGS. 2 and 3.

Referring to FIG. 1 and in accordance with the present invention there is provided a novel and improved electrical collector shoe assembly for a rail electrification system, comprising a unique combination of metal holder member and collector shoe that are fixedly but releasably secured to one another by means of cooperable interengaging surfaces on both parts, and a thrust means which applies force to the interengaging surfaces in such a direction as to maintain their mechanical engagement and electrical contact with one another.

The electrical collector shoe is particularly shown in FIGS. 2–5, and comprises an elongate metal body 12 having substantially parallel, elongate top and bottom surfaces 14 and 16, and oppositely-disposed parallel side surfaces 18 and 20. The opposite ends of the top surface 14 have bevelled or slabbed-off portions 22, constituting lead-in surfaces for the shoe assembly 10 as it travels along the track (not shown) of an electrical conductor rail.

By the invention each side surface 18, 20 of the collector shoe 12 is provided with a recess or groove 24, 26, respectively, extending for substantially its entire length, the grooves 24, 26 having a V- or corner-configuration extending through an angle of 90 degrees or so, in a preferred form. In addition, the shoe 12 has a pair of sockets 28 in the form of blind holes, the purpose of which will be described below.

Referring now to FIGS. 6–9, the invention provides a unique metal holder member 30 comprising an elongate block body 32 having oppositely-disposed sides 34, 36 that are substantially parallel to one another, and upstanding spaced-apart gripping means comprising parallel upstanding flanges 38, 40 which are integrally formed therewith. The upstanding flanges 38, 40 constitute spaced-apart gripping means that cooperate with the grooves 24, 26, respectively in the collector shoe 12, in maintaining the shoe 12 and holder member 30 in assembled relation, as in FIGS. 1 and 10.

Figure 9:
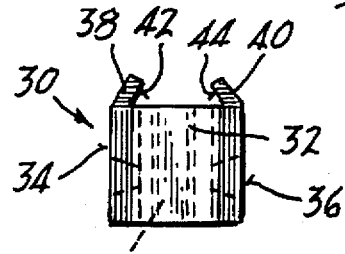
FIG. 9 is a right end elevation of the holder member of FIGS. 6–8.

Referring to FIG. 9, the flanges 38, 40 have sloped inner surfaces 42, 44, respectively which face each other in the manner of the jaws of a clamp. The flanges 38, 40 in effect define undercuts, which are received in the recesses 24, 26, respectively of the collector shoe 12 in the manner of FIG. 10. The arrangement is somewhat similar to that of a dovetail and dovetail joint, the bottom surface 16 and grooves 24, 26 of the shoe 12 constituting the dovetail, and the upper surface and inner surfaces 42, 44 of the flanges 38, 40, respectively constituting the female portion of the joint.

Figure 6:
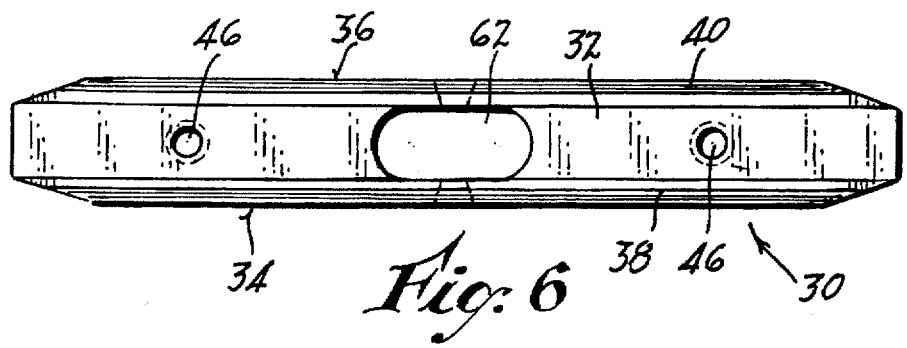
FIG. 6 is a top plan view of the holder member of the collector shoe assembly of FIG. 1.
Figure 7:
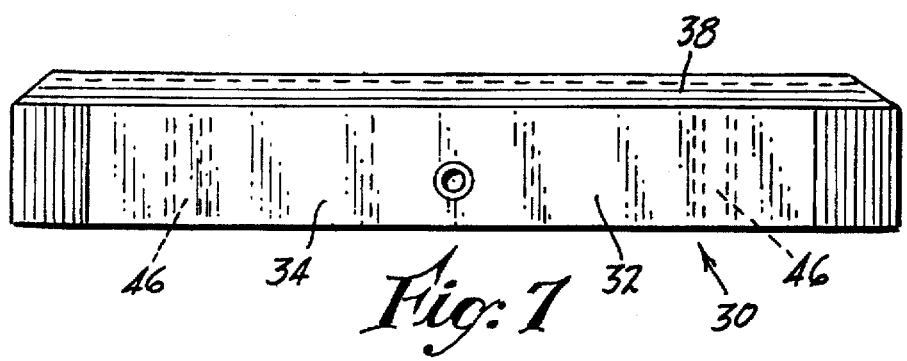
FIG. 7 is a front elevation of the holder member of FIG. 6.
Figure 8:
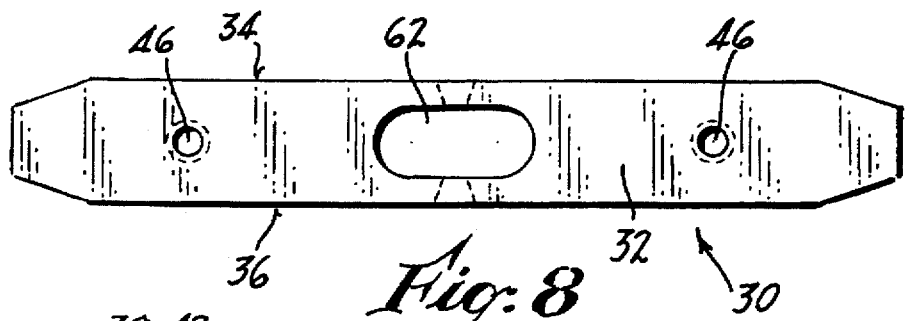
FIG. 8 is a bottom plan view of the holder member of FIGS. 6 and 7.
Figure 10:
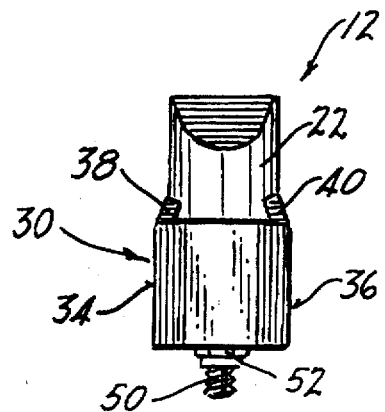
FIG. 10 is a right end elevation of the collector shoe assembly of FIG. 1, showing the collector shoe and holder member in assembled relation.

Further, by the invention the holder member 30 has transverse threaded bores 46 extending completely through the member 30, as shown in dotted line in FIG. 7, and in solid outline in FIGS. 6 and 8; additionally, thrust means are provided, comprising a pair of screws 50, FIGS. 1 and 10, carried by the threaded bores 46 and extending into the sockets 28 of the collector shoe 12. The screws 50 are provided with lock nuts 52, to retain them in given, fixed positions in the holder member 30, as shown.

The holder member 30 is mechanically supported by a pivot pin 54, FIG. 1, an electrically insulating block 56, an interposed spring 58, and a metal rod 60. The latter is electrically insulated from the holder member 30 by the insulating block 56. The member 30 has an oblong opening or through slot 62 to accommodate an apertured stud head 64 through which the pivot pin 54 passes. The shank of the stud head 64 is affixed in the block 56. Electrical connection is made to the holder member 30 by a suitable spade lug (not shown), preferably located under one of the lock nuts 52.

In carrying out the initial assembly of the collector shoe 12 and holder member 30, the latter and shoe 12 are slidably engaged with one another, the flanges 38, 40 of the holder member 30 respectively being received in the grooves or recesses 24, 26 of the collector shoe 12, with the screws 50 in the holder member 30 backed-off. The collector shoe 12 is manually centered on the holder member 30, as in FIG. 1, at which time the screws 50 will align with the sockets 28 such that upon the screws' advancement, they seat in the sockets 28 and retain the shoe 12 against subsequent longitudinal movement on the holder member 30. As the screws 50 are advanced, an upwardly-directed thrust or force is applied to the shoe 12, which increases the reactive force between the lower walls of the recesses 24, 26 in FIG. 5, and the inner surfaces 42, 44, respectively of the flanges 38, 40 in FIG. 9. Following sufficient tightening of the screws 50, the lock nuts 52 are secured to retain the screws 50 in their fixed, adjusted positions.

By such an arrangement, the collector shoe 12 is mechanically secured by virtue of the gripping forces between the interengaging surfaces comprising the walls of its grooves 24, 26, and the facing holder flanges 38, 40, such engagement being maintained by the upwardly directed thrust of the screws 50 on the bottoms of the sockets 28, respectively.

Replacement of a worn collector shoe 12 is readily accomplished by merely loosening the lock nuts 52, unscrewing the two screws 50 so as to clear the side walls of the sockets 28, and slidably removing the worn shoe 12 and installing a new shoe. Due to the elongate nature of the flanges 38, 40 and grooves 24, 26, the static friction therebetween is considerable after the screws 50 are tightened. The forces experienced by the screws 50 are relatively small, and the forces experienced by the flanges 38, 40 and groove walls, are largely dispersed or spread out over the full length of shoe/holder assembly.

An especially rugged yet reliable structure is thereby realized, without sacrifice of ease of replacement. The device is thus highly immune to potentially damaging vibration as a consequence of the unitary nature of the assembled parts.

The collector shoe assembly as described herein is thereby seen to represent a distinct advance and improvement in the field of rail electrification systems.

Variations and modifications are possible without departing from the spirit of the invention.

Each and every one of the appended claims defines an aspect of the invention which is separate and distinct from all others; and accordingly it is intended that each claim be treated as such when examined in the light of the prior art devices in any determination of novelty or validity.

What is claimed is:

1. An electrical collector shoe assembly for a rail electrification system, comprising in combination:
    a) a metal holder member comprising an elongate block body having spaced-apart gripping means projecting from its opposite sides upwardly and inwardly and above the top of the body,
    b) an elongate metal collector shoe extending along the top of the block body, said shoe having recessed surfaces in its opposite sides, in which said gripping means are disposed, and
    c) advanceable means carried by said block body and engaged with the under portion of the collector shoe, applying an upward thrust to the shoe to cause the gripping means of the block body to be forcibly engaged with the recessed surfaces of the shoe, thereby establishing firm electrical contact between the shoe and holder member.

2. An electrical collector shoe assembly as set forth in claim 1, wherein:
    a) said gripping means comprises thin-walled portions of the block body.

3. An electrical collector shoe assembly as set forth in claim 2, wherein:
    a) said thin-walled portions of the block body comprise parallel flanges upstanding from the side walls of the body.

4. An electrical collector shoe assembly as set forth in claim 1, wherein:
    a) said recessed surfaces of the collector shoe comprise grooves in the side walls thereof.

5. An electrical collector shoe assembly as set forth in claim 4, wherein:
    a) the grooves in the collector shoe have a V-section configuration.

6. An electrical collector shoe assembly as set forth in claim 5, wherein:
    a) the walls of the V-section grooves make an angle of substantially 90 degrees.

7. An electrical collector shoe assembly as set forth in claim 1, wherein:
    a) said advanceable means comprise screws threaded in the block body.

8. An electrical collector shoe assembly as set forth in claim 7, wherein:
    a) the collector shoe has sockets in which the ends of the screws are received.

9. An electrical collector shoe assembly as set forth in claim 7, wherein:
    a) said screws have lock nuts by which they are secured in adjusted position against turning.

10. A holder member for an electrical collector shoe, comprising in combination:
    a) a solid elongate block body of metal having a bottom surface and a flat top surface and having oppositely-facing coextensive exterior parallel side surfaces, and further having spaced-apart elongate gripping means projecting above said flat top surface upwardly and inwardly from the oppositely-facing parallel side surfaces of the block body so as to not project laterally therefrom,
    b) said gripping means being coextensive with each other and being disposed along the length of the block body, and
    c) said gripping means comprising angularly-extending thin-walled flanges of uniform thickness which are integral with the block body and which have been inwardly formed, all portions of said flanges being of uniform thickness and being disposed above the plane of the flat top surface of the block body and all said portions being spaced angularly inwardly of the parallel side surfaces of the block body and extending angularly inwardly toward each other,
    d) the outer surfaces of said flanges being continuations of the exterior parallel side surfaces of the block body, e) said block body having a plurality of threaded bores extending from the bottom surface to the top surface thereof, f) screws threaded into said threaded bores, g) lock-nuts carried by said screws, h) an elongate slot in said block body midway between the ends thereof, i) said slot extending between the top and bottom surfaces of the block body and being adapted to receive the stud head of a metal rod, j) said block body having transverse passages which open into said slot and which are adapted to receive a pivot pin.

11. A holder member for an electrical collector shoe as set forth in claim 10, wherein:

a) said flanges comprise thin-wall extensions of the oppositely-facing side wall portions of the block body.

12. A holder member for an electrical collector shoe as set forth in claim 10, wherein:

a) the said flanges of the gripping means extend in parallel directions.

13. A holder member for an electrical collector shoe as set forth in claim 12, wherein:

a) said flanges have sloped inner surfaces which face each other in the manner of the jaws of a clamp.

* * * * *